Nov. 30, 1965 W. L. GOVAN 3,220,237
ADJUSTABLE SHEAR MOUNTING FOR A HYDRAULIC EXTRUSION PRESS
Filed Jan. 29, 1962 5 Sheets-Sheet 1

INVENTOR.
WILLIAM L. GOVAN
BY
ATTORNEYS

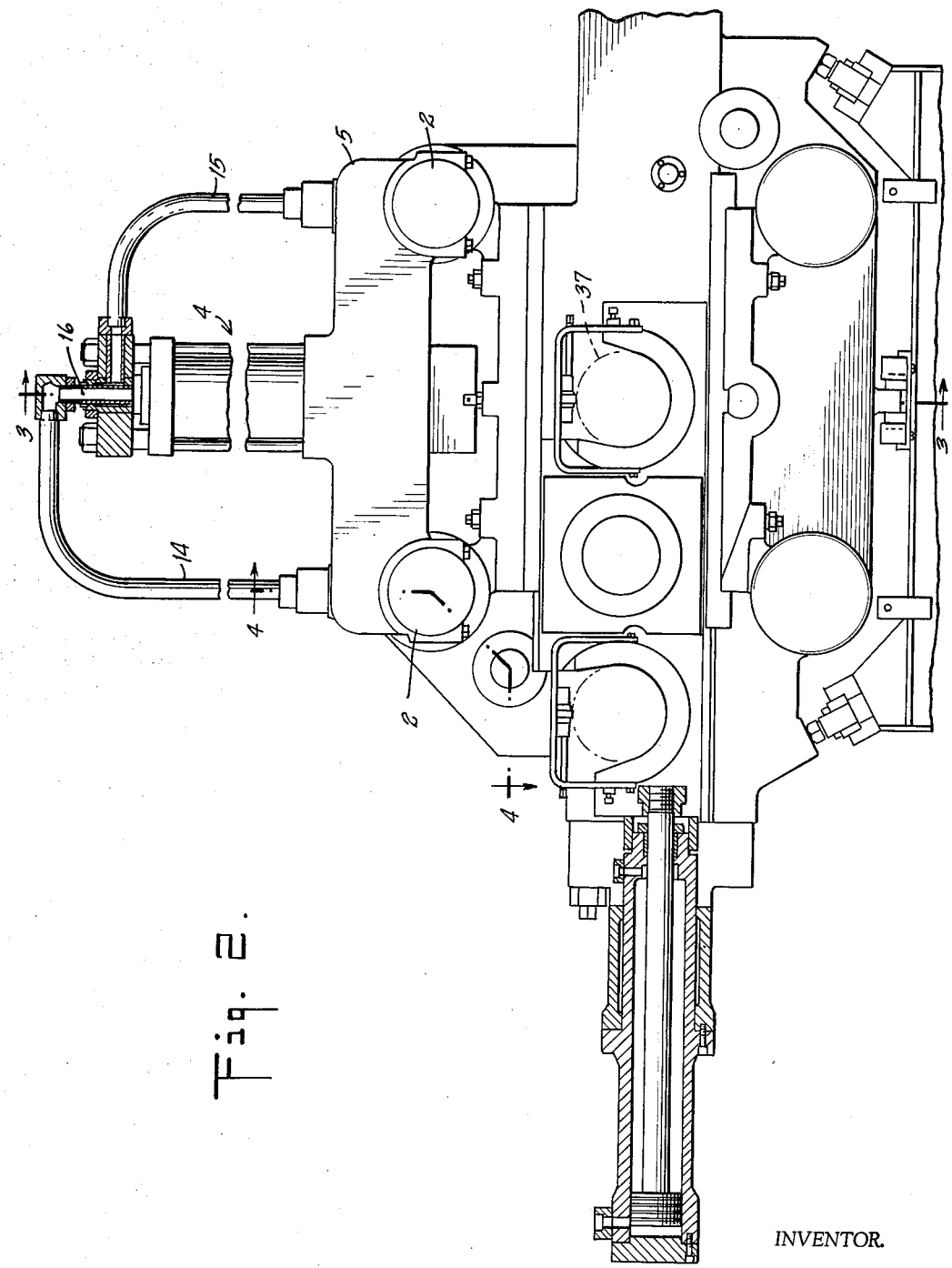

Nov. 30, 1965  W. L. GOVAN  3,220,237
ADJUSTABLE SHEAR MOUNTING FOR A HYDRAULIC EXTRUSION PRESS
Filed Jan. 29, 1962  5 Sheets-Sheet 4

INVENTOR.
WILLIAM L. GOVAN
BY
ATTORNEYS

United States Patent Office 3,220,237
Patented Nov. 30, 1965

3,220,237
ADJUSTABLE SHEAR MOUNTING FOR A
HYDRAULIC EXTRUSION PRESS
William L. Govan, Brighton, N.Y., assignor to Farrel Corporation, Rochester, N.Y., a corporation of Connecticut
Filed Jan. 29, 1962, Ser. No. 169,310
7 Claims. (Cl. 72—255)

This invention relates to hydraulic extrusion presses for metal and more particularly to an adjustable shear mounting for such presses.

A metal extrusion press, of course, is operated so that hydraulic pressure drives a ram through a billet container like a piston through a cylinder to extrude billet metal through a die which is mounted at the far end of the container. The billet is not completely extruded in this operation, but instead its trailing or butt end remains more or less flattened against the front of the die when the ram completes its stroke. It is held there by the already extruded metal which forms a neck extending through the die, and it is necessary to cut through this neck adjacent to the front of the die to remove the butt-end before the next billet is placed in the container and extruded. A shear is used for this purpose, and means must be provided to align its knife with the front of the forward die face. It has, heretofore, been the practice to use shims for this adjustment of the shear knife to provide the proper clearance. There were a number of problems with the method. The dies used in a press vary in size due to wear, repair and design, and accordingly the location of their inner faces may vary by a matter of inches. Shimming a blade by such large amounts is inconvenient, it reduces the rigidity of its mounting, and it causes the cutting plane to be offset from the powering hydraulic cylinder and ram.

This invention overcomes these traditional problems for the first time and provides means whereby the entire shear assembly may be conveniently moved to align the knife with the inner die face.

Briefly, a generally conventional shear assembly is carried by a yoke that rides on two of the main tie rods of an extrusion press. The shear knife is positioned with respect to the die face by moving the yoke forward and backward over the press bed. This is accomplished by rotating a nut that is axially held by the press end platen and which engages a threaded bolt that is attached at its other end to the yoke. Telescoping pipes carry fluid between the shear assembly and the end platen. These pipes and joints are located substantially in the same horizontal plane as the positioning bolt so as to minimize the strains upon them.

The invention is described more fully with respect to the following drawings in which:

FIG. 1a and b is a plan view of a modern hydraulic extrusion press embodying the invention;

FIG. 2 is an end view of the inner side of the shear assembly of the press of FIG. 1 and of the end platen assembly;

Figure 1A:
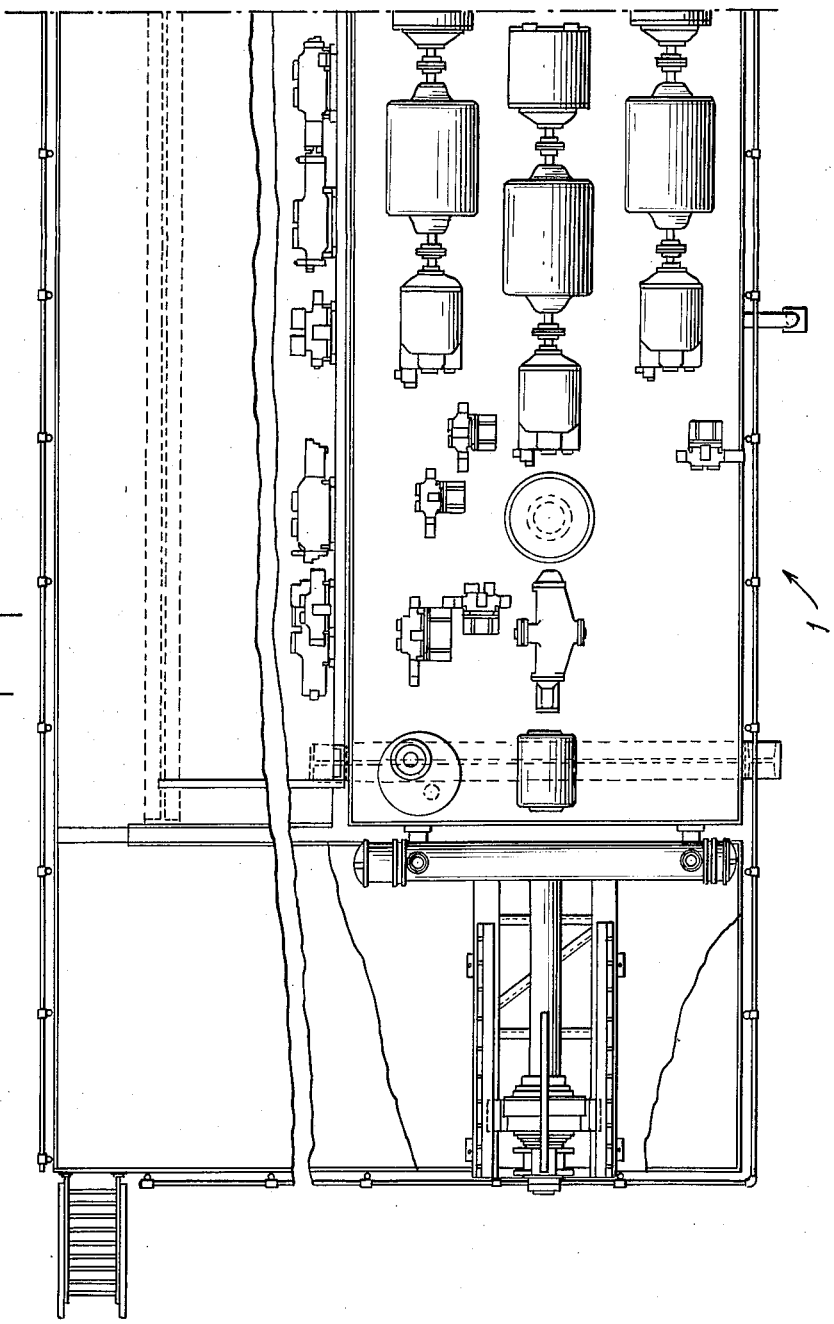
Figure 1B:
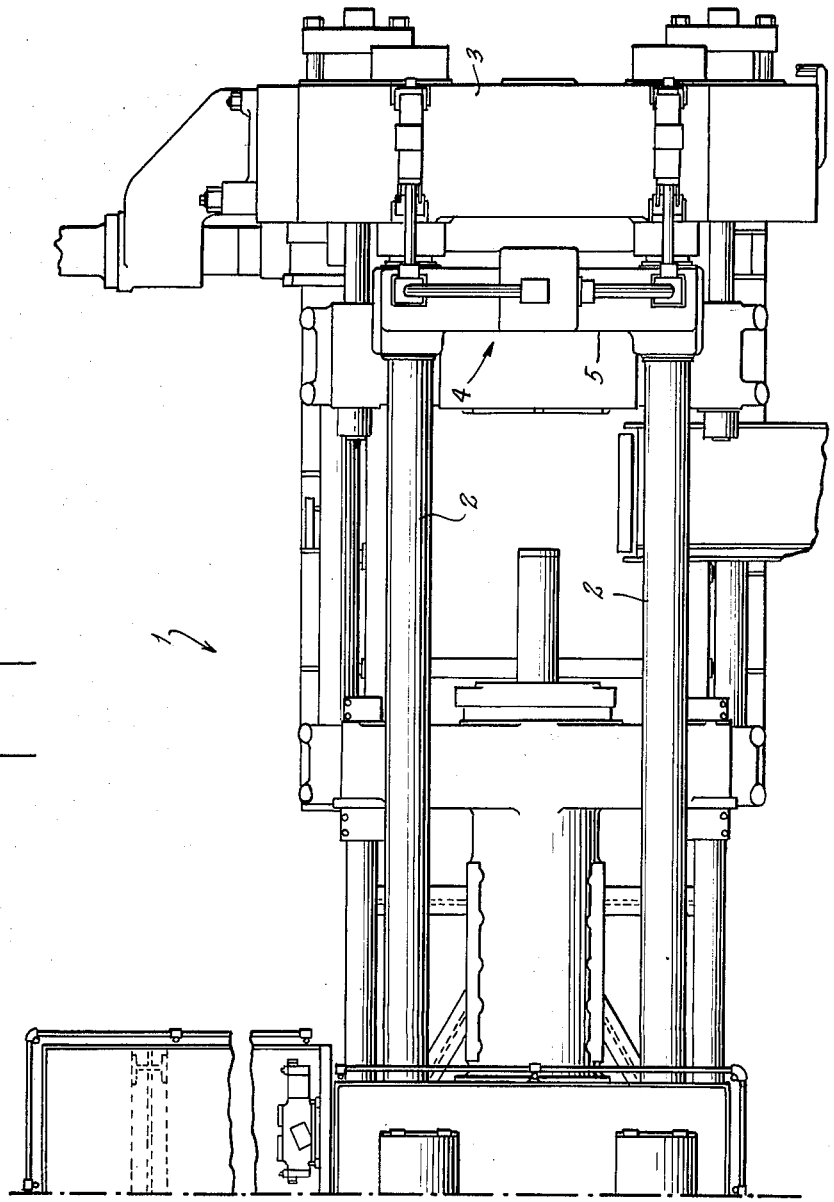
Figure 3:
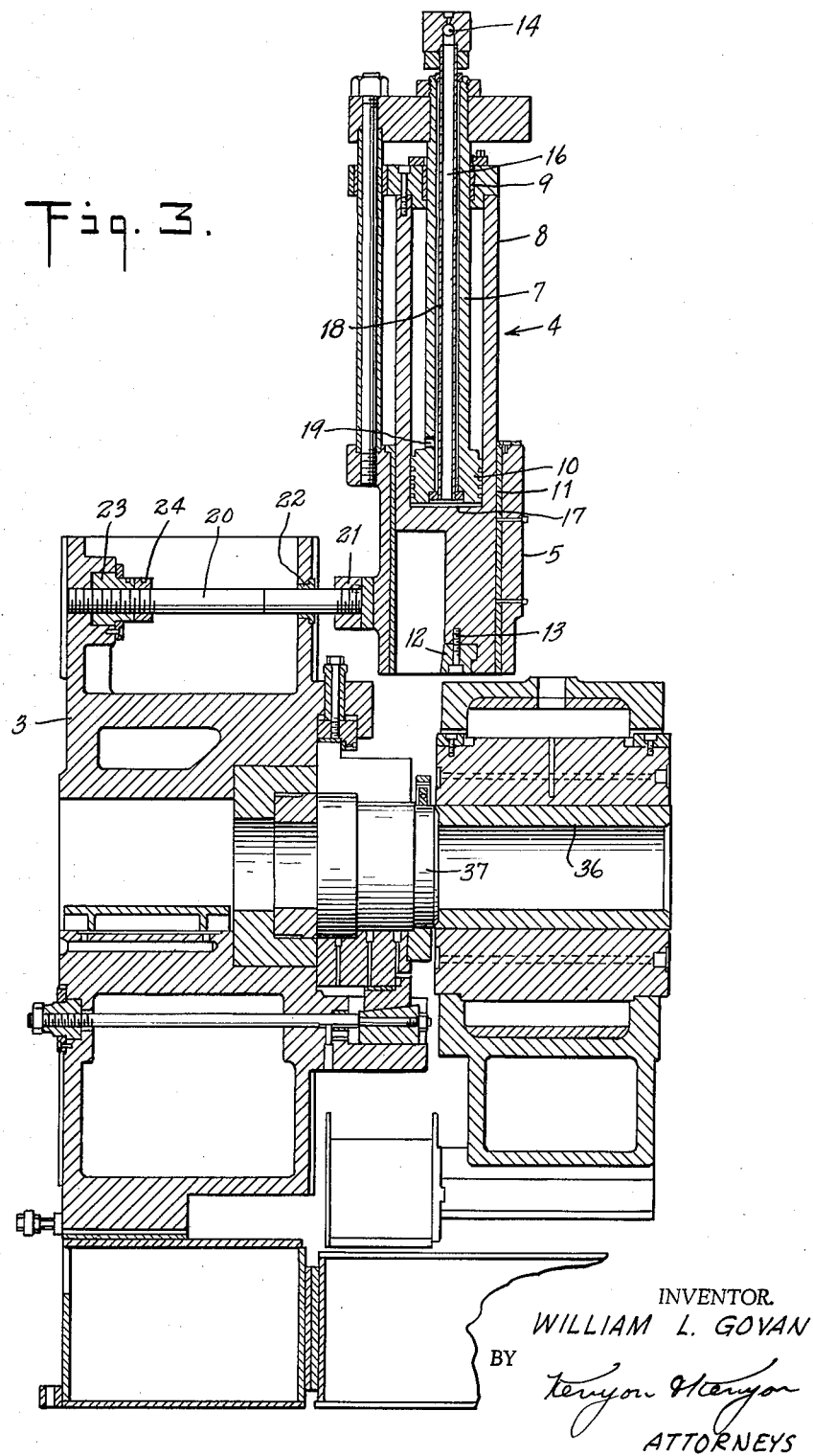
FIG. 3 is a partial sectional side view of the press of FIG. 1 and in particular of the end platen and the shear assembly taken geenrally along the line 3—3 in FIG. 2.
Figure 4:
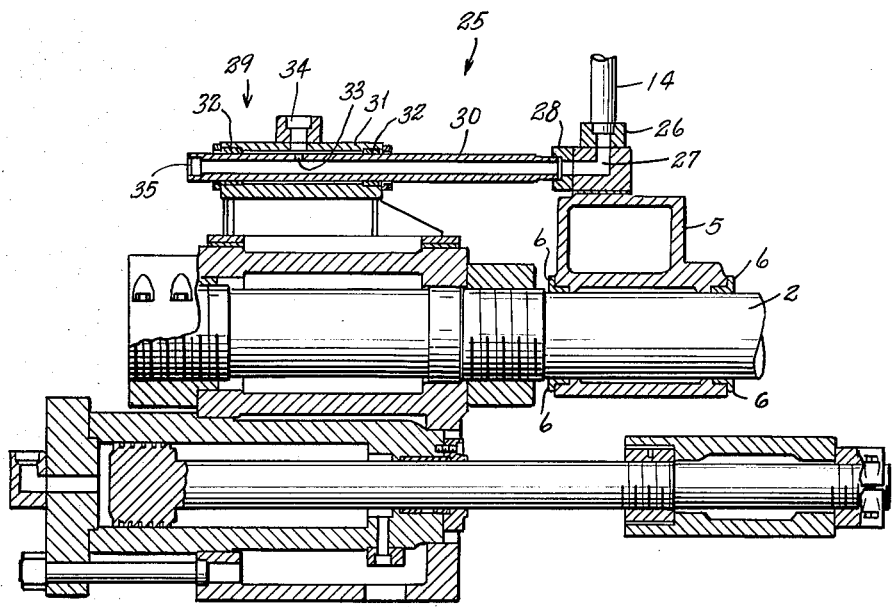
FIG. 4 is a detail sectional view of the telescopic fluid connection for the shear assembly taken along line 4—4 in FIG. 2.

A modern high pressure metal extrusion press which includes the present invention is shown in FIG. 1 and designated generally as 1. It is of a sort which is well known to those skilled in this art and, except as hereinafter described, is of the conventional design that includes main tie rods 2 and an end platen 3.

A shear assembly designated generally as 4 is carried by shear yoke 5 which clamps around the tie bars 2 and includes bronze bushings 6.

The shear assembly 4 includes a centrally located fixed double acting ram 7 around which is positioned a sliding cylinder 8 with packing 9 and piston rings 10. The cylinder 8 is guided through vertical bushings 11 in the yoke 5 and it carries in its lower portion a knife 12. No shims are required for the adjustment of this knife and so it can have a simple and rigid rectangular shape and may be held securely against the cylinder by screws or bolts 13 which extend in the same direction as the sliding motion or cutting force. The knife stroke is powered hydraulically by fluid circulated through lines 14 and 15. Line 14 extends between the yoke fitting for one telescopic connection, described below, and fluid passageway 16 which extends longitudinally through the center of ram 7 and to the inside of cylinder 8 at mouth 17, below the piston rings 10. Line 15 extends between the yoke fitting for the other fluid connection and passageway 18, which extends longitudinally through the ram 7 around the passageway 16 to port 19 which opens to the inside of cylinder 8 above the piston rings.

The shear assembly 4 is moved along the press bed on tie rods 2 by means of a shaft or bolt 20. This bolt is fastened at one end to the yoke 5 by conventional means indicated at 21 with some float but secured against rotation and axial movement relative to the yoke.

The bolt extends through bushing 22 in the end platen 3 and is threadably engaged by a rotatable round nut 23 which is axially retained in the end platen. The round nut 23 and a lock nut 24 are easily accessible from the end of the press and may be conveniently operated to extend and retract bolt 20 and thereby the shear assembly 4 and the knife 12.

Fluid is circulated through lines 14 and 15 from a hydraulic power system through two telescopic connections 25. Lines 14 and 15 are received in fittings 26 on the yoke 5. Passageway 27 extends to fittings 28 that are mounted substantially in the plane of the adjusting screw or bolt 20 and each close to one of the tie rods 2 on which the yoke slides.

Telescopic fittings 29 are affixed to the end platen 3 and axially aligned with the fittings 28 in the direction of the main press tie rods.

Tubular members 30 extend between and connect these fittings to carry fluid from the end platen to the yoke. Each tubular member or pipe 30 is rigidly held by a fitting 28 on the shear yoke 5 and extends concentrically through a tubular member 31 of one of the telescopic fittings 29. The sliding joint between the tubular members 30 and 31 is sealed by packing 32. A port 33 into the inside of tubular member 30 connects it with the inside of tubular member 31 in the cylindrical area sealed by packaging 32. Fluid is supplied to this area through fitting 34. Pipe 30 is, of course sealed at 35.

In operation, the billet container 36 is moved axially inwardly away from the die face or the face of the die plate 37 at the conclusion of the extrusion stroke by conventional means to expose the die face and the butt or trailing end of the billet which must be sheared off. The knife 12 is then aligned to stroke adjacent to the die face by rotating the round nut 23. The bolt or screw 20 may be fitted with a pointer and scale so that continuous adjustment may be made to place the knife at the correct position for a die of known measurement.

Once positioned, the shear is operated in the conventional manner.

Presses like that described above may be constructed with flexible hoses or "walking" pipes and swivel joints in place of the telescopic connections 25 to carry fluid to and from the shear assembly. Such presses may have a shear assembly which moves on separate ways, rather than on the tie rods 2, and may include a conventionally fixed cylinder and sliding piston and rod for the shear assembly.

What is claimed is:

1. A horizontal metal extrusion press having four tie rods, an end platen assembly including an extrusion die, a shear assembly including a yoke frame, a fixed double acting hydraulic ram, a sliding hydraulic cylinder, a shear knife attached to said cylinder, carried on the upper two of said tie rods upstream of said end platen and slidable along said tie rods, adjustment means extending between said shear assembly and said press end platen including a shaft, a round nut, means attaching said shaft to said yoke frame at one end, and said round nut threadably engaging said shaft at the other end, said round nut rotatably journaled and axially restrained in said end platen, whereby rotation between said nut and said shift adjusts the distance between the shear assembly and the press end platen, and telescopic means for circulating hydraulic fluid to and from said shear assembly including two fittings on the yoke frame, a first tubular member rigidly held by said fittings and axially parallel to said tie rods, a second tubular member rigidly attached to said end platen and concentric to said first tubular member, said tubular members adapted for relative sliding motion and means directing fluid flow from one of said tubular members into the other, said tubular member located substantially in the plane of said adjustment means, whereby said shear assembly may be positioned along the press bed as needed to position the shear knife for operation adjacent the front of the extrusion die.

2. In an extrusion press having an end platen with an extrusion die, billet container means for holding billet material upstream of the die, ram-powering means, tie rods interconnecting the end platen with the ram-powering means, and a ram powered by said ram-powering means and reciprocable along the axis of the press for forcing billet material from the container through the die; a shearing assembly and means for supporting said shearing assembly on at least one of said tie rods whereby the shearing assembly may be axially reciprocated along the tie rod.

3. In an extrusion press having an end platen with an extrusion die, container means for holding a billet upstream of the die, a ram for forcing the billet material from the container through the die, ram-powering means, and tie rods interconnecting the ram-powering means with said end platen; a shearing assembly including shear-powering means and a blade powered by said means, means for supporting said shearing assembly on at least one of said tie rods for axial movement of the shearing assembly toward and away from the end platen and positioning means interconnecting the shearing assembly and the press for adjusting the position of the assembly along the tie rod.

4. In an extrusion press having an end platen with an extrusion die, container means for holding billet upstream of the die, a ram and ram-powering means for forcing billet material out of the container and through the extrusion die, and a plurality of tie rods rigidly interconnecting the ram-powering means with the end platen; a shearing assembly with hydraulic motor powering means and a shear blade powered by said means, means for supporting said shearing assembly on at least two of the tie rods, positioning means extending between the shearing assembly and the press for adjusting the position of the shearing assembly along the tie rods; fluid transport means for supplying hydraulic fluid to and from the shearing assembly and the hydraulic motor thereof, at least one portion of said fluid transport means comprising one tubular member rigidly affixed to the end platen and a second tubular member rigidly affixed to the shearing assembly, said tubular members being concentric.

5. In an extrusion press having an end platen with an extrusion die, container means for holding billet upstream of the die, a ram and ram-powering means for forcing billet material out of the container and through the extrusion die, and a plurality of tie rods rigidly interconnecting the ram-powering means with the end platen; a shearing assembly with hydraulic motor powering means and a shear blade powered by said means, means for supporting said shearing assembly on at least two of the tie rods, positioning means extending between the shearing assembly and the end platen for adjusting the position of the shearing assembly along the tie rods, fluid transport means for supplying hydraulic fluid to and from the shearing assembly and the hydraulic motor thereof, at least one portion of said fluid transport means comprising one tubular member rigidly affixed to the end platen and a second tubular member rigidly affixed to the shearing assembly, said tubular members being concentric, the said positioning means being in a plane with the said tubular members that is substantially parallel to a plane through the tie rods supporting said shearing assembly.

6. In a horizontal metal extrusion press, an end platen assembly including an extrusion die, a billet container for holding billet material upstream of the die, a main press ram with main press ram-powering means for forcing the billet material from the container and through the die, four tie rods rigidly interconnecting the main ram powering means with the end platen assembly; a shearing assembly including a double-acting hydraulic motor, and a shear knife rigidly attached to said motor, a yoke frame supporting said shearing assembly, said yoke frame carried by bearing means on two of said tie rods so as to be axially adjustable and slidable along said tie rods, positioning means extending between the shearing assembly yoke and the press for axially reciprocating said shearing assembly along said tie rods whereby the shear knife may be positioned for operation adjacent the front of the extrusion die, and fluid transport means for circulating hydraulic fluid to the hydraulic motor of said shearing assembly, further fluid transport means for circulating hydraulic fluid from said shearing assembly.

7. The structure of claim 6, supra, in which at least one of said hydraulic fluid transport means includes a first tubular member rigidly affixed to said end platen and axially parallel to said tie rods, a second tubular member rigidly affixed to said shearing assembly yoke and concentric to said first tubular member, said tubular members adapted for relative sliding motion.

References Cited by the Examiner

UNITED STATES PATENTS

| 2,110,777 | 3/1938 | Streine | 83—560 |
| 2,417,249 | 3/1947 | Griswald | 285—302 |
| 2,685,460 | 8/1954 | Ogborn et al. | 285—298 |
| 2,778,421 | 1/1957 | Munschaur | 83—640 |
| 2,870,522 | 1/1959 | Hickman et al. | 207—1.2 |
| 2,886,836 | 5/1959 | Moeltzner | 207—1.2 |
| 2,905,317 | 9/1959 | Arenz | 207—3 |
| 3,019,894 | 2/1962 | Delcroix et al. | 207—1.1 |

CHARLES W. LANHAM, Primary Examiner.

WILLIAM W. DYER, JR., MICHAEL V. BRINDISI, Examiners.